(12) United States Patent
Schindelin et al.

(10) Patent No.: US 8,251,231 B2
(45) Date of Patent: Aug. 28, 2012

(54) CORRUGATED OR PLEATED FLAT MATERIAL

(75) Inventors: Andreas Schindelin, Stuttgart (DE); Wolfram Schadt, Kraichtal (DE)

(73) Assignee: FSP Fluid Systems Partners Holding AG, Baar (CH)

( * ) Notice: Subject to any disclaimer, the term of this patent is extended or adjusted under 35 U.S.C. 154(b) by 297 days.

(21) Appl. No.: 12/660,236

(22) Filed: Feb. 22, 2010

(65) Prior Publication Data

US 2010/0224554 A1  Sep. 9, 2010

Related U.S. Application Data

(63) Continuation of application No. PCT/EP2008/004929, filed on Jun. 19, 2008.

(30) Foreign Application Priority Data

Aug. 24, 2007 (DE) .......................... 10 2007 040 892

(51) Int. Cl.
*B01D 29/07* (2006.01)
*B01D 39/10* (2006.01)
*B01D 27/06* (2006.01)

(52) U.S. Cl. .................. 210/493.1; 210/493.5; 210/499; 210/488; 210/489; 210/490

(58) Field of Classification Search .................. None
See application file for complete search history.

(56) References Cited

U.S. PATENT DOCUMENTS

| | | | |
|---|---|---|---|
| 3,057,481 A | 10/1962 | Pall | |
| 4,070,519 A | 1/1978 | Lefkowitz et al. | |
| 4,113,535 A | 9/1978 | Lefkowitz et al. | |
| 4,304,669 A | 12/1981 | Knothe et al. | |
| 5,084,178 A | 1/1992 | Miller et al. | |
| 5,266,279 A | 11/1993 | Haerle | |
| 5,731,065 A | 3/1998 | Stelzmüller et al. | |
| 5,782,299 A | 7/1998 | Simone et al. | |
| 5,899,271 A | 5/1999 | Simone et al. | |
| 5,937,944 A | 8/1999 | Simone et al. | |
| 6,113,784 A | 9/2000 | Stoyell et al. | |
| 6,511,600 B1 * | 1/2003 | Ohtani | 210/500.41 |
| 6,517,919 B1 | 2/2003 | Griffin | |

(Continued)

FOREIGN PATENT DOCUMENTS

CA          968720          6/1975

(Continued)

*Primary Examiner* — Benjamin Kurtz
(74) *Attorney, Agent, or Firm* — Lipsitz & McAllister, LLC

(57) ABSTRACT

The invention relates to a corrugated or pleated flat material with a plurality of pleats or corrugations that run parallel to one another and successively define a pleat or corrugation peak and a pleat or corrugation valley, the peak and valley being connected to one another by way of a pleat or corrugation flank, wherein a fluid can flow through the flat material and the flat material has at least one deformable functional layer which rests on a supporting layer in the direction of throughflow of the fluid, said supporting layer comprising a supporting fabric, the functional layer allowing foreign substances to be removed from or delivered to the fluid. In order to develop the flat material in such a way that it has greater mechanical load-bearing capacity and lower resistance to throughflow, it is proposed according to the invention that the supporting fabric is deformable and comprises a twill weave. Furthermore, the use of a supporting fabric of this kind for providing support on the outflow side for a pleated or corrugated functional layer is proposed.

15 Claims, 3 Drawing Sheets

U.S. PATENT DOCUMENTS

| | | |
|---|---|---|
| 6,910,589 B1 | 6/2005 | Rose et al. |
| 2005/0072744 A1 | 4/2005 | Tushaus et al. |

FOREIGN PATENT DOCUMENTS

| | | |
|---|---|---|
| CA | 1 260 655 | 9/1989 |
| CA | 2105636 | 3/1995 |
| CH | 621 711 | 2/1981 |
| DE | 89 01 213 | 5/1989 |
| DE | 43 10 110 | 1/1994 |
| DE | 694 09 264 | 9/1998 |
| DE | 197 37 954 | 3/1999 |
| DE | 697 19 037 | 11/2003 |
| DE | 699 13 148 | 6/2004 |
| EP | 0 215 087 | 3/1987 |
| EP | 0 350 192 | 1/1990 |
| EP | 0 505 832 | 9/1992 |
| WO | 98/30315 | 7/1998 |
| WO | 03/033100 | 4/2003 |

* cited by examiner

Fig. 3
Fig. 4
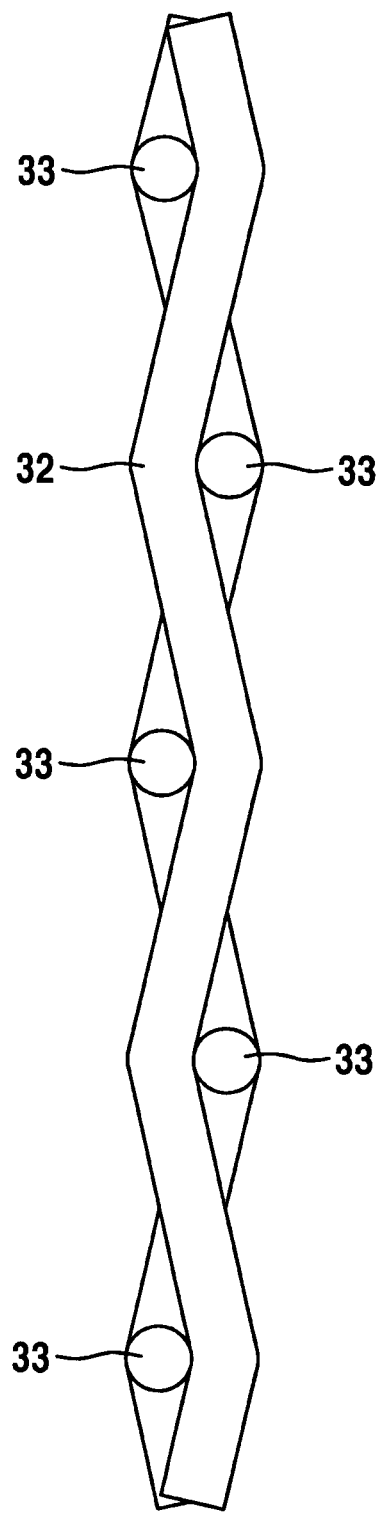
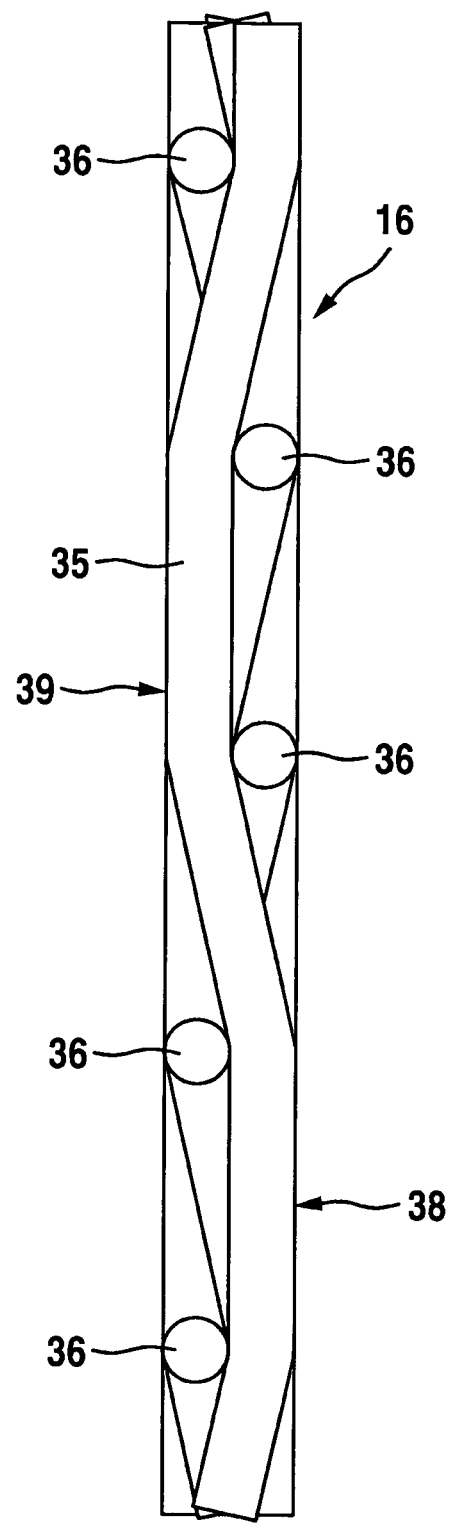

Fig. 5
Fig. 6
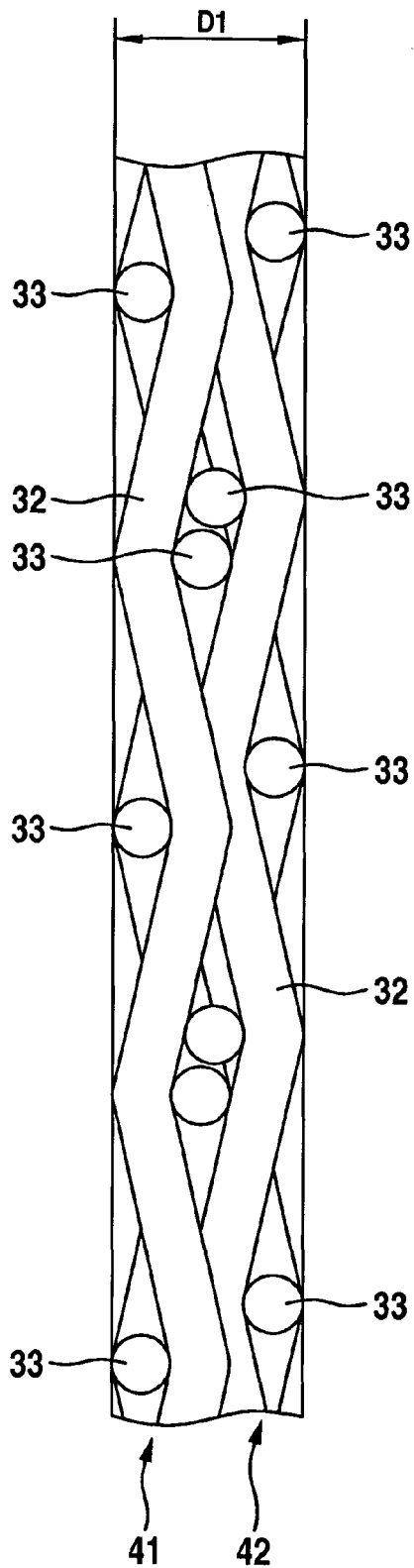
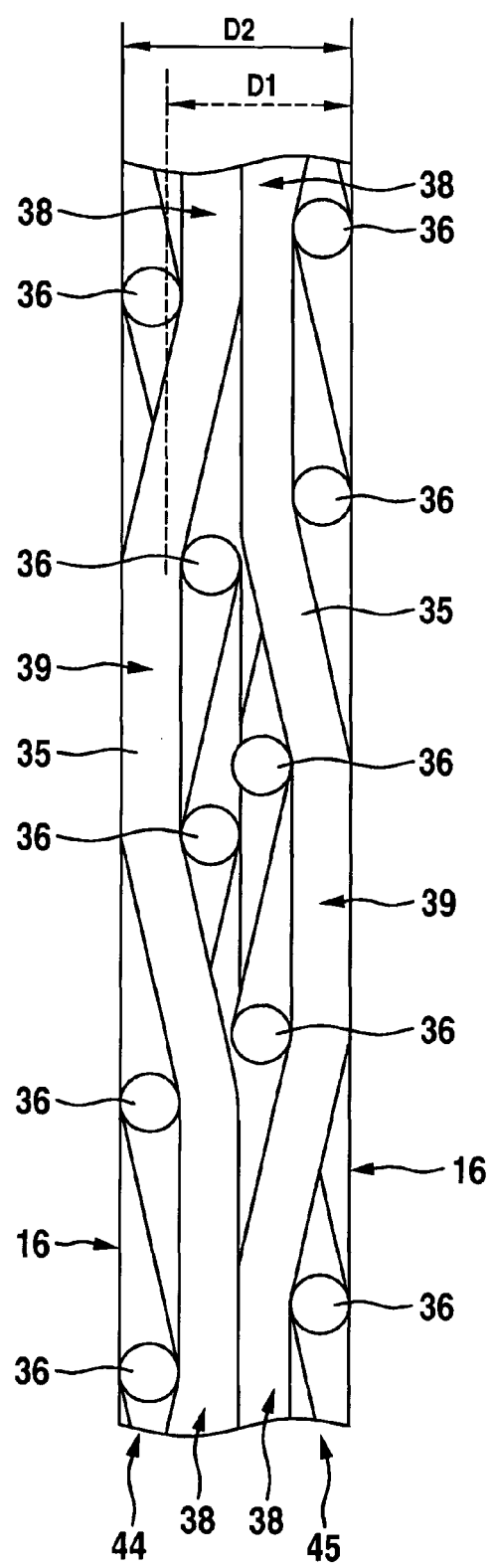

CORRUGATED OR PLEATED FLAT MATERIAL

This application is a continuation of international application number PCT/EP2008/004929 filed on Jun. 19, 2008.

The present disclosure relates to the subject matter disclosed in international application number PCT/EP2008/004929 of Jun. 19, 2008 and German application number 10 2007 040 892.9 of Aug. 24, 2007, which are incorporated herein by reference in their entirety and for all purposes.

BACKGROUND OF THE INVENTION

The invention relates to a corrugated or pleated flat material with a plurality of pleats or corrugations that run parallel to one another and successively define a pleat or corrugation peak and a pleat or corrugation valley, the peak and valley being connected to one another by way of a pleat or corrugation flank, wherein a fluid can flow through the flat material and the flat material has at least one deformable functional layer which rests on a supporting layer in the direction of throughflow of the fluid, said supporting layer comprising a supporting fabric, the functional layer allowing foreign substances to be removed from or delivered to the fluid.

By means of flat materials of this kind, a foreign substance, in particular a chemical, can be delivered to a fluid, for example a liquid, by means of desorption. For this purpose, the functional layer of the flat material may be impregnated with the chemical, the chemical being released when the fluid flows through. Flat materials of the kind mentioned at the beginning are also suitable for removing foreign substances or chemicals from the fluid flowing through, for example by adsorption, absorption or filtering. The functional layer can hold back foreign substances, for example contaminating particles, so that the content of foreign substances in the fluid can be reduced by virtue of the fluid flowing through the functional layer.

The through-flow of the fluid is accompanied by a loss of fluid pressure, i.e. the pressure of the fluid on the inflow side of the flat material is greater than on the outflow side, and the pressure loss causes mechanical loading of the functional layer. In order to avoid impairment of the functional layer, the latter is supported by means of a supporting layer, on which the functional layer rests. The supporting layer is of a grid-like configuration, for example in the form of a woven fabric.

In order to increase the effective surface area of the flat material, it is usually pleated or corrugated, since this allows the effectively usable surface area to be increased without the outer dimensions of the flat material having to be correspondingly increased. The loading of the flat material by the fluid flowing through may, however, have the consequence that the pleats or corrugations come to lie in close abutment against one another, in particular on the outflow side of the flat material. This increases the throughflow resistance of the flat material and consequently the pressure loss sustained by the fluid flowing through.

In the case of a flat material configured as a screen element, it is therefore proposed in U.S. Pat. No. 3,057,481 to make the supporting fabric as stiff and nondeformable as possible. For this purpose, the flat material is sintered, so that the functional layer is firmly bonded to the supporting layer. For this purpose, however, relatively thick filaments are required for the supporting layer, which is formed as a woven fabric, and this once again increases the pressure loss experienced by the fluid flowing through. Furthermore, in the case of flat materials of this kind, there is the risk of the materials suffering mechanical impairment, for example by formation of cracks, in particular under changing pressure loads. A further disadvantage is that, with a configuration of this kind, only sinterable functional layers can be used.

In DE 197 37 954 A1, to avoid what is known as pack forming, that is to say the pleats or corrugations of the flat material closely abutting one another, it is proposed to use an additional supporting structure with at least one supporting bead, which extends transversely in relation to the pleats, for example in the form of a helix. This is a relatively complex construction that entails not inconsiderable production costs.

It is an object of the present invention to develop a corrugated or pleated flat material of the kind mentioned at the beginning in such a way that it has greater mechanical load-bearing capacity and lower throughflow resistance.

SUMMARY OF THE INVENTION

This object is achieved according to the invention in the case of a flat material of the type in question by the supporting fabric being deformable and comprising a twill weave.

The invention involves the concept that the mechanical load-bearing capacity of the corrugated or pleated flat material can be increased by making not only the functional layer but also the supporting fabric deformable. This allows the risk of damage occurring under changing pressure loads to be reduced. In spite of the high mechanical load-bearing capacity, the flat material according to the invention is distinguished by a lower throughflow resistance. This is due to the fact that the supporting fabric comprises a twill weave. This is distinguished by the weft thread of the supporting fabric being made to pass under at least one warp thread of the supporting fabric, then over at least two warp threads, to then be made to pass again under at least one warp thread. Alternatively, the weft thread may be made to pass under at least two warp threads and then over at least one warp thread. The directly adjacent weft thread has this same sequence offset by at least one warp thread. This produces a typical diagonal pattern distinguished by diagonally running ribs. It has been found that the throughflow resistance of the flat material can be reduced by using a twill weave for the supporting fabric.

It is of particular advantage if, in the region where pleat or corrugation flanks of the flat material are facing one another, thread or filament portions of the supporting fabric that protrude in the outflow direction, that is to say warp lifts and/or weft lifts on the outflow side, in other words regions in which the warp threads or the weft threads are disposed on the upper side of the fabric on the outflow side, at least partially abut one another when subjected to loading by the fluid flowing through. It has been found that this has the effect that, between pleat or corrugation flanks facing one another on the outflow side, there form stable micro-channels, which make it possible for the fluid to flow through with very greatly reduced flow losses. In the case of an embodiment of this kind, as a departure from a configuration of the corrugated or pleated flat material that is as rigid as possible, as known from the prior art, pleat or corrugation flanks of the supporting fabric that are facing one another on the outflow side, that is to say the regions on the outflow side between a pleat or corrugation valley and a pleat or corrugation peak, can abut one another, and thereby support one another, when they are exposed to loading by the fluid flowing through. In spite of this mutual abutment of the pleat or corrugation flanks, the resistance with which the flat material opposes the flow of the fluid through it can be kept low, since the abutment on the outflow side of pleat or corrugation flanks facing one another takes place in such a way that only thread or filament portions of the supporting fabric that protrude in the outflow direction come into abutment with one another, stable micro-channels through which the fluid can flow being formed at the same time.

The formation of stable micro-channels on the outflow side of the supporting fabric leads to a considerable reduction in the throughflow resistance. If the supporting fabric woven in a twill weave is pleated or corrugated and there is then fluid flow through it, on the outflow side pleat flanks or corrugation flanks facing one another can at least partially abut one another as long as there are corresponding differential pressures. However, the abutment then takes place in such a way that only thread or filament portions protruding on the outflow side abut one another with pointwise or linear contact, while forming stable micro-channels that extend in the direction from the pleat or corrugation valley to the pleat or corrugation peak. Pleats or corrugations of the supporting fabric that are adjacent to one another can consequently support one another on the outflow side without the supporting fabric being damaged, and at the same time the fluid can flow through the stable micro-channels between the pleat flanks that abut one another. The twill weave ensures here that a relative movement of the protruding thread or filament portions facing one another does not impair the micro-channels.

It is of particular advantage if the flat material forms a hollow-cylindrical, circumferentially closed bellows with axially running pleat or corrugation peaks and pleat or corrugation valleys, the fluid being able to flow through the bellows in the radial direction. The configuration in the form of bellows gives the flat material particularly great mechanical stability, while at the same time a large effectively usable surface area can be provided. The flat material configured as a bellows in the form of a hollow cylinder may be mechanically supported at the end faces of the bellows by means of suitably shaped holding plates. In addition, a supporting tube that is configured in a manner colinear with the cylinder axis of the bellows and has a multiplicity of apertures may be used, the tube supporting the flat material on the outflow side.

In the case of an advantageous configuration of the invention, the supporting fabric has threads made of metal running parallel to the pleats or corrugations and threads made of a plastics material running perpendicularly to the pleats or corrugations. The provision of metal threads allows electric charges that occur in the region of the supporting fabric when the fluid passes through to be discharged in a simple manner, so that static charging of the supporting fabric and of the flat material as a whole can be prevented. The metal threads run parallel to the pleats or corrugations of the flat material and are therefore not subjected to any significant flexural loading. The risk of the electrically conductive threads breaking when changing pressure loads occur can be kept very low as a result. The threads running transversely to the pleats or corrugations are produced from a plastics material. These can easily bend in a manner corresponding to the pleated or corrugated configuration of the flat material without any risk of mechanical impairment and without the risk of the threads produced from plastics material breaking.

It may be provided that the weft threads of the supporting fabric run parallel to the pleats or corrugations and the warp threads run perpendicularly to the pleats or corrugations. In the case of a configuration of this kind, the weft threads are preferably produced from metal and a plastics material is preferably used for producing the warp threads.

It is of particular advantage if the density of the threads of the supporting fabric that run parallel to the pleats or corrugations is less than the density of the threads of the supporting fabric that run perpendicularly to the pleats or corrugations, since the throughflow resistance of the fluid can be kept particularly low as a result. This applies in particular in the case of the formation of the micro-channels explained above, since they run perpendicularly to the pleats or corrugations of the supporting fabric.

The density of the threads running parallel to the pleats or corrugations is preferably at most 80% of the density of the threads of the supporting fabric that run perpendicularly to the pleats or corrugations.

To reduce the throughflow resistance for the fluid, it is of advantage if the mesh width of the threads running parallel to the pleats or corrugations is greater than the mesh width of the threads running perpendicularly to the pleats or corrugations. The mesh width of the threads running parallel to the pleats or corrugations is preferably at least 10%, in particular at least 25% to 100%, greater than the mesh width of the threads running perpendicularly to the pleats or corrugations.

As mentioned at the beginning, the corrugated or pleated flat material may be used in various ways for removing or delivering foreign substances. For example, foreign substances can be filtered out of the fluid by means of the flat material. For this purpose, the functional layer of the flat material comprises a filter material. The filter material may, for example, be produced from paper or a nonwoven material. It is preferably configured in such a way that the degree of separation for particles that are larger than the nominal particle size defined by the filter fineness is at least 99.5%. The nominal particle size is in this case preferably in the range of less than 100 µm. By contrast with the filter material, the supporting fabric has virtually no filtering function. The filter material may be made much finer than the supporting fabric. The mesh width of the supporting fabric may, for example, be at least 200 µm, preferably approximately 1000 µm.

It is of particular advantage if the functional layer is of a multi-ply configuration. For example, the functional layer may have a middle layer in the form of a nonwoven, which is produced from a synthetic fiber material or glass fiber material and lies flat against protective nonwovens on the inflow side and outflow side.

It is advantageous if the number of warp lifts and warp lowerings of the supporting fabric are the same. Fabrics with a twill weave in which the number of warp lifts and warp lowerings are the same are also referred to as twill of uniform line. In the case of a configuration of this kind, the warp and weft threads are distributed uniformly over the surface of the weave. Twill weaves of this kind are therefore also referred to as unidirectional.

Twill weaves are identifiable by their diagonal rib, which may run from top left to bottom right (known as S rib twill) or from bottom left to top right (known as Z rib twill). It is of advantage if the supporting fabric comprises a twill weave with a changing direction of the rib, that is to say what is known as an alternating twill. This is distinguished by particularly great mechanical stability.

The diameter of the threads of the supporting fabric is preferably at most 60% of the mesh width. This allows the supporting fabric to be provided with a large proportion of open surface area, so that it has virtually no filtering function.

The threads aligned parallel to the pleats or corrugations of the flat material preferably have a lesser thread thickness than the threads aligned perpendicularly to the pleats or corrugations. In particular, the thread thickness of the parallel running threads may be at least 10%, preferably at least 25% to 50%, less than the thread thickness of the perpendicular threads.

In the case of a preferred configuration, the flat material also comprises a fabric with twill weave on the inflow side of the functional layer. Among the advantages of this is that stable micro-channels can also be created on the inflow side to reduce the throughflow resistance.

The invention also relates to the use of a supporting fabric for providing support on the outflow side for a pleated or corrugated functional layer with a plurality of pleats or corrugations that run parallel to one another and successively define a pleat or corrugation peak and a pleat or corrugation valley, the peak and valley being connected to one another by way of a pleat flank, wherein the functional layer is deformable and the fluid can flow through it, the functional layer allowing foreign substances to be removed from or delivered to the fluid and the supporting fabric engaging against the functional layer on the outflow side and being pleated or corrugated in the same way as the functional layer, and the supporting fabric being deformable and comprising a twill weave.

As already explained, the use of a supporting fabric of this kind allows the mechanical load-bearing capacity of the combination of functional layer and supporting fabric to be increased and the throughflow resistance to be reduced.

Of particular advantage is the use of a supporting fabric with a twill weave in which, in the region where pleat or corrugation flanks are facing one another, thread or filament portions that protrude in the outflow direction at least partially abut one another when subjected to loading by the fluid flowing through, since stable micro-channels through which the fluid can flow with very greatly reduced flow loss form in the region of the mutually abutting pleat or corrugation flanks of the supporting fabric.

A supporting fabric with threads made of metal running parallel to the pleats or corrugations and threads made of a plastics material running perpendicularly to the pleats or corrugations is preferably used. As already explained, this allows static charging of the supporting fabric and the functional layer to be avoided, and at the same time the risk of the threads produced from metal breaking is low.

It is of advantage if a supporting fabric with weft threads which run parallel to the pleats or corrugations and with warp threads which run perpendicularly to the pleats or corrugations is used.

Supporting fabrics of this kind are used in particular in combination with functional layers which comprise a filter material, for example a nonwoven or paper layer. The functional layer may be of a multi-ply configuration.

It is advantageous for the use of the supporting fabric for providing support on the outflow side for a pleated or corrugated functional layer if the density and/or the thickness of the threads of the supporting fabric that run parallel to the pleats or corrugations of the supporting fabric is lower than the density or thickness of the threads running perpendicularly to the pleats or corrugations. For example, the density or the thickness of the threads running parallel to the pleats or corrugations may be at most 80% of the density or thickness of the threads running perpendicularly to the pleats or corrugations.

A supporting fabric which has virtually no filtering function is preferably used.

The following description of a preferred embodiment of the invention serves for further explanation in conjunction with the drawings.

BRIEF DESCRIPTION OF THE DRAWINGS

FIG. 3 shows a sectional view of a supporting fabric known per se, with plain weave;

FIG. 4 shows a sectional view of a supporting fabric used according to the invention, with twill weave;

FIG. 5 shows a sectional view of two plies, lying one on top of the other, of a supporting fabric known per se, with plain weave;

FIG. 6 shows a sectional view of two plies, lying one on top of the other, of the supporting fabric used according to the invention, with twill weave.

DETAILED DESCRIPTION OF THE INVENTION

Figure 1:
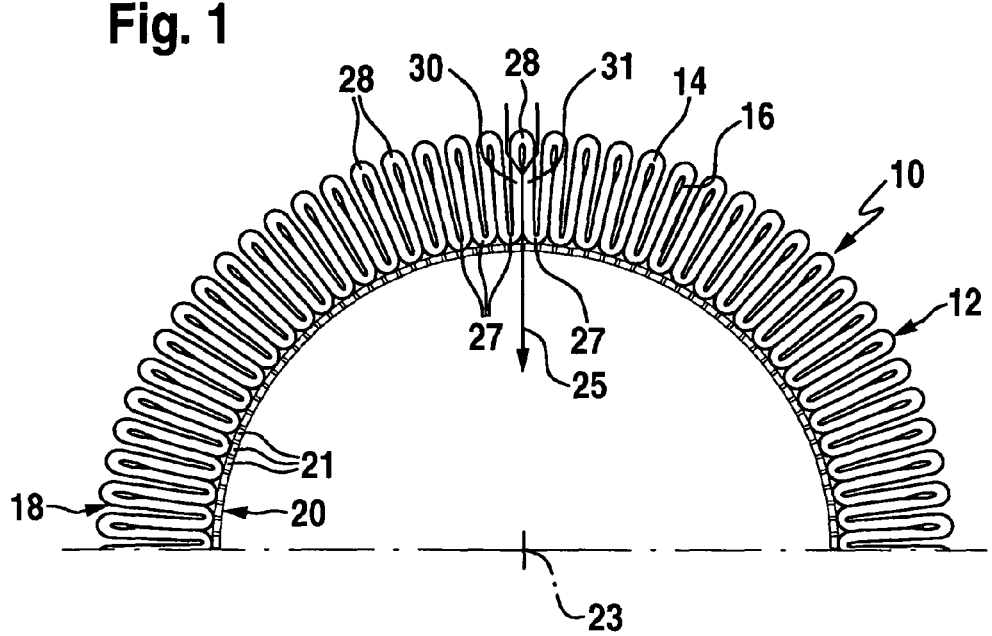
FIG. 1 shows a half section of a filter element with a pleated flat material according to the invention.
Figure 2:
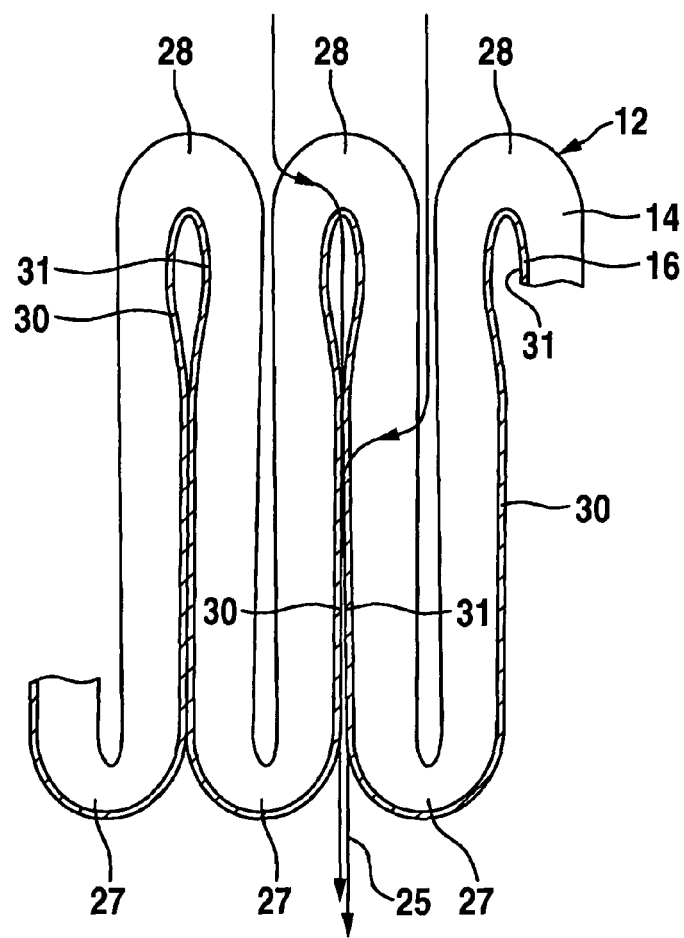
FIG. 2 shows an enlarged representation of the flat material used in FIG. 1.

In FIG. 1, a filter element 10 is illustrated in a purely schematic representation, with a flat material 12 pleated in a star-like manner and, as clearly revealed by FIG. 2, comprising a functional layer in the form of a filter layer 14 and a supporting layer in the form of a supporting fabric 16. The pleated flat material 12 forms a hollow-cylindrical, circumferentially closed bellows 18, only half of which is represented in FIG. 1 to achieve a better overview. The bellows 18 is supported on the inside on a supporting tube 20, which has a multiplicity of apertures 21. The longitudinal axis of the supporting tube 20 is aligned coaxially with the cylinder axis 23 of the bellows 18.

The filter layer 14 is preferably of a multi-ply form and comprises a fine filter layer of a nonwoven material, which is covered on both sides by a coarse filter layer. A filter layer of this kind is known per se to the person skilled in the art, for which reason the multi-ply configuration of the filter layer 14 is not shown in detail in the drawing.

The filter layer 14 in combination with the supporting fabric 16 is flowed through radially from the outside to the inside by a fluid, in the exemplary embodiment represented by hydraulic oil. In FIGS. 1 and 2, the direction of flow of the hydraulic oil is schematically shown by the arrow 25. The invention is of course not restricted to this direction of flow.

The entire flat material 12 is pleated in such a way that pleat peaks 27 and pleat valleys 28 alternate in the circumferential direction of the bellows 18. On account of the direction of flow 25 of the hydraulic oil flowing through, the pleat peaks 27 are disposed radially on the inside and the pleat valleys 28 are disposed radially on the outside. Extending between the pleat peaks 27 and the pleat valleys 28 there are in each case pleat flanks 30 and 31 of the flat material 12.

The supporting fabric 16 supports the filter layer 14 on the outflow side of the fluid, that is to say on the side facing the supporting tube 20.

The star-like configuration of the bellows 18 is shown in FIG. 1 in an only very roughly schematic form. In fact, in order for it to have an effective surface area that is as large as possible, the flat material 12 is provided with very close pleats, so that pleat flanks 30, 31 adjacent one another on the outflow side are disposed with very little spacing from one another. If hydraulic oil flows through the pleated flat material 12, the material deforms in such a way that pleat flanks 30, 31 facing one another on the outflow side at least partially abut one another. This is schematically represented in FIG. 2. Pleat flanks 30, 31 of the supporting fabric 16 that are facing one another on the outflow side consequently touch, at least in partial regions.

The supporting fabric 16 comprises a twill weave. FIG. 4 illustrates the structure of the supporting fabric with twill weave that is used. For better comparison, a supporting fabric known from the art, with plain weave, is shown in FIG. 3. In the case of a plain weave, the weft thread 32 runs over and under a warp thread 33 in an alternating manner. By contrast with this, in the case of the exemplary embodiment represented, the weft thread 35 of the supporting fabric 16 that is used according to the invention runs under two warp threads 36, to then run over two warp threads 36, then again under two warp threads 36, and so on. The directly adjacent weft thread has this same sequence offset by one. Weft lifts 38 consequently extend over two adjacent warp threads, with the same correspondingly applying to weft lowerings 39.

If two plies 41, 42 of a fabric in plain weave, as schematically represented in FIG. 5, come into abutment directly with one another as a result of pleat or corrugation formation, a slight relative displacement of the two plies 41, 42 may have the effect that there forms a very dense pack, the thickness D1 of which is less than the sum of the thicknesses of the individual plies 41 and 42.

If, on the other hand, two plies 44, 45 of the supporting fabric 16 that is used according to the invention, with twill weave, come into abutment directly with one another as a result of pleat or corrugation formation, as schematically represented in FIG. 6, thread or filament portions protruding in the outflow direction, in particular warp and weft lifts that are facing and crossing one another, abut one another. The total thickness D2 of the plies 44, 45 of the fabric with twill weave that are abutting one another as a result of pleat or corrugation formation is greater than the total thickness D1 of the plies 41, 42 of the fabric with plain weave that are abutting one another as a result of pleat or corrugation formation. Between the plies 44, 45 of the fabric with twill weave that are abutting one another as a result of pleat or corrugation formation there form micro-channels which are not impaired but retain their configuration in a stable manner even when there is a slight relative movement of the two plies 44, 45.

As already explained, the filter element 10 comprises a flat material 12 with a supporting fabric 16 which is woven in a twill weave. In the same way as the filter layer 14, the supporting fabric 16 is configured to be deformable, so that the entire flat material 12 can therefore deform. When hydraulic oil flows radially through, pleat flanks 30, 31 facing one another on the outflow side can partially abut one another, as is schematically represented in FIG. 2. On account of the twill weave that is used for the supporting fabric 16, the structure described above and illustrated in FIG. 6, with warp lifts and weft lifts on the outflow side abutting one another and stable micro-channels through which the hydraulic liquid can flow running substantially radially in relation to the cylinder axis 23, forms in the regions of the pleat flanks 30, 31 that are abutting one another on the outflow side.

The weft threads 32 of the supporting fabric 16 run parallel to the pleats of the flat material 12, i.e. they run in the axial direction of the bellows 18, and the warp threads 33 run perpendicularly to the pleats, i.e. in the circumferential direction of the bellows. The mesh width of the weft threads 32 is greater than the mesh width of the warp threads 33, for example the mesh width of the weft threads 32 may be approximately one third greater than the mesh width of the warp threads 33. The micro-channels that form run in the radial direction, that is to say perpendicularly to the weft threads 32.

The filter element 10 according to the invention is distinguished by a relatively low throughflow resistance for the hydraulic oil, and nevertheless has great mechanical stability. The mechanical stability is achieved by the use of the deformable supporting fabric 16 and the deformable filter layer 14, it being possible for pleat flanks 30, 31 of the supporting fabric 16 that are facing one another on the outflow side to at least partially abut one another. As a result, a mechanically stable structure of the bellows 18 is achieved. In spite of this great mechanical stability, the hydraulic oil can flow through the flat material 12 with little pressure loss, since, on account of the twill weave, micro-channels which run radially in relation to the cylinder axis 23 and through which the hydraulic oil can flow with relatively little flow loss form in the region of the pleat flanks 30, 31 that abut one another on the outflow side.

Use of the flat material 12 is not restricted to the cylindrical bellows 18. The flat material 12 with filter layer 14 and supporting fabric 16 may also form what is known as a flat pleated filter, which extends along a plane or else along a curved surface that is preferably formed by a metal supporting sheet with a multiplicity of apertures.

A pleated flat material with a functional layer and a supporting fabric with a twill weave that supports said functional layer in the direction of throughflow may also be used for enriching a fluid with a chemical. For this purpose, the flat material may be impregnated with the chemical and, when a fluid, preferably a liquid, flows through it, the chemical is released in a dosed amount in the liquid. It is also possible in this case for the throughflow resistance of the pleated flat material to be kept low by the use of a supporting fabric with twill weave, on account of the formation of micro-channels aligned in the direction of flow.

The invention claimed is:

1. Corrugated or pleated flat material, comprising:
a plurality of pleats or corrugations that run parallel to one another and successively define a pleat or corrugation peak and a pleat or corrugation valley,
the peak and valley being connected to one another by way of a pleat flank,
wherein:
a fluid can flow through the flat material and the flat material has at least one deformable functional layer which rests on a supporting layer in a direction of throughflow of the fluid, said supporting layer comprising a supporting fabric, the functional layer allowing foreign substances to be removed from or delivered to the fluid,
the supporting fabric is deformable and comprises a twill weave, and
the supporting fabric comprises threads made of metal running parallel to the pleats or corrugations and threads made of a plastics material running perpendicularly to the pleats or corrugations.

2. Flat material according to claim 1, wherein, in a region where pleat flanks of the flat material are facing one another, thread or filament portions of the supporting fabric that protrude in an outflow direction at least partially abut one another when subjected to loading by the fluid flowing through.

3. Flat material according to claim 1, wherein the flat material forms a hollow-cylindrical, circumferentially closed bellows with axially running pleat peaks and pleat valleys, the fluid being able to flow through the bellows in a radial direction.

4. Flat material according to claim 1, wherein weft threads of the supporting fabric run parallel to the pleats or corrugations and warp threads of the supporting fabric run perpendicularly to the pleats or corrugations.

5. Flat material according to claim 1, wherein at least one of a density and a thickness of the threads of the supporting fabric that run parallel to the pleats or corrugations is less than the density or thickness of the threads running perpendicularly to the pleats or corrugations of the supporting fabric.

6. Flat material according to claim 1, wherein a mesh width of the threads running parallel to the pleats or corrugations is greater than the mesh width of the threads running perpendicularly to the pleats or corrugations.

7. Flat material according to claim 1, wherein the functional layer comprises a filter material.

8. Flat material according to claim 7, wherein the supporting fabric has virtually no filtering function.

9. Flat material according to claim 1, wherein the functional layer is of a multi-ply configuration.

10. Flat material according to claim 1, wherein the twill weave is configured as an alternating twill.

11. Flat material according to claim 1, wherein a diameter of the threads of the supporting fabric is at most 60% of a mesh width.

12. Corrugated or pleated flat material, comprising:
a plurality of pleats or corrugations that run parallel to one another and successively define a pleat or corrugation peak and a pleat or corrugation valley,
the peak and valley being connected to one another by way of a pleat flank,
wherein:
a fluid can flow through the flat material and the flat material has at least one deformable functional layer which rests on a supporting layer in a direction of throughflow of the fluid, said supporting layer comprising a supporting fabric, the functional layer allowing foreign substances to be removed from or delivered to the fluid,
the supporting fabric is deformable and comprises a twill weave, and
at least one of a density and a thickness of threads of the supporting fabric that run parallel to the pleats or corrugations is less than the density or thickness of the threads running perpendicularly to the pleats or corrugations of the supporting fabric.

13. Flat material according to claim 12, wherein the threads of the supporting fabric running parallel to the pleats or corrugations are made of metal and the threads running perpendicularly to the pleats or corrugations are made of a plastics material.

14. Corrugated or pleated flat material, comprising:
a plurality of pleats or corrugations that run parallel to one another and successively define a pleat or corrugation peak and a pleat or corrugation valley,
the peak and valley being connected to one another by way of a pleat flank,
wherein:
a fluid can flow through the flat material and the flat material has at least one deformable functional layer which rests on a supporting layer in a direction of throughflow of the fluid, said supporting layer comprising a supporting fabric, the functional layer allowing foreign substances to be removed from or delivered to the fluid,
the supporting fabric is deformable and comprises a twill weave, and
a mesh width of threads of the supporting fabric running parallel to the pleats or corrugations is greater than the mesh width of the threads running perpendicularly to the pleats or corrugations.

15. Corrugated or pleated flat material, comprising:
a plurality of pleats or corrugations that run parallel to one another and successively define a pleat or corrugation peak and a pleat or corrugation valley,
the peak and valley being connected to one another by way of a pleat flank,
wherein:
a fluid can flow through the flat material and the flat material has at least one deformable functional layer which rests on a supporting layer in a direction of throughflow of the fluid, said supporting layer comprising a supporting fabric, the functional layer allowing foreign substances to be removed from or delivered to the fluid,
the supporting fabric is deformable and comprises a twill weave, and
a diameter of threads of the supporting fabric is at most 60% of a mesh width.

* * * * *